(12) United States Patent
Carter et al.

(10) Patent No.: US 6,731,993 B1
(45) Date of Patent: May 4, 2004

(54) COMPUTER TELEPHONY AUDIO CONFIGURATION

(75) Inventors: George E. Carter, Santa Clara, CA (US); Shmuel Shaffer, Palo Alto, CA (US); William J. Beyda, Cupertino, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/527,074

(22) Filed: Mar. 16, 2000

(51) Int. Cl.[7] .............................................. G06E 17/00
(52) U.S. Cl. ......................................... 700/94; 345/727
(58) Field of Search ................................ 700/94; 710/8, 710/9, 11; 713/1; 709/219, 220; 381/56–59, 101–103, 96; 345/727, 728; 379/90.01

(56) References Cited

U.S. PATENT DOCUMENTS

| 5,797,028 A | 8/1998 | Gulick et al. | |
| 5,870,465 A | 2/1999 | Hosbach et al. | |
| 5,896,443 A | 4/1999 | Dichter | |
| 5,917,893 A | 6/1999 | Katz | |
| 5,983,068 A | 11/1999 | Tomich et al. | |
| 6,003,097 A | * 12/1999 | Richman et al. | 710/8 |
| 6,009,151 A | 12/1999 | Staples | |
| 6,009,398 A | 12/1999 | Mueller et al. | |
| 6,011,851 A | 1/2000 | Connor et al. | |
| 6,067,084 A | * 5/2000 | Fado et al. | 345/708 |
| 6,492,999 B1 | * 12/2002 | Fado et al. | 345/727 |

* cited by examiner

Primary Examiner—Melur Ramakrishnaiah

(57) ABSTRACT

Techniques for validating an audio configuration of a computer are provided. Validation tests are performed on the audio configuration and results from the tests are displayed to a user as a report. The report can include an indication of the audio configuration settings that will adversely affect the audio quality for such uses as computer telephony. Additionally, the report can indicate a recommendation on changing the audio configuration to improve audio quality and can assist the user in making the audio configuration change.

33 Claims, 9 Drawing Sheets

COMPUTER TELEPHONY AUDIO CONFIGURATION

BACKGROUND OF THE INVENTION

The present invention relates to audio configuration for computer systems. More particularly, the invention relates to validating an audio configuration of a computer for computer telephony.

Conventional telephones operate using circuit-switched technology. The circuit-switched telephone backbone is composed of dedicated copper wires or fiber optic cables that are typically owned by the telephone companies. In general, the telephone companies charge telephone call fees, based on the duration of the call and the distance between the caller and receiver, that are designed to cover the costs for installing, expanding and maintaining the telephone backbone.

With packet-switched telephone systems, a speaker's voice (or other data) is broken down and sent over a computer network as multiple packets. Computer telephony can offer significant cost savings because dedicated network connections are replaced by network connections shared among many users, which results in much more efficient use of bandwidth and reduced wiring costs. Additionally, in theory, computer telephony can offer easier administration.

In the past, the computer and network technologies had not advanced to the point where the quality of computer telephony approached the quality of conventional telephone systems. Therefore, the cost and convenience savings of computer telephony came at a price of lower quality. However, as computer and network technologies continue to improve, the quality differential is diminishing or is non-existent, and so computer telephony is becoming more and more prevalent.

One of the major problems facing computer telephony clients is that they are executing on computers with general purpose operating systems. These general purpose operating systems are designed to support a wide variety of applications so there are typically a very large number of audio configuration settings. Although the numerous audio configuration settings allow the computers to be very flexible and adaptable to a wide variety of applications, there is a considerable increase in complexity in audio configuration. Audio configuration errors and less-than-optimal configurations are common, which often results in a variety of audio quality problems that in turn impede the effectiveness of computer telephony systems.

The conventional solution to complex audio configuration of computer systems is to rely on information technology experts. The expert can set the audio configuration in person, give instructions to a user over the telephone or by e-mail, utilize an application sharing session, or the like. The expert can be employed by the company be an independent contractor, or be employed by a computer telephony vendor.

A major disadvantage of utilizing information technology experts for audio configuration is the high cost of employing the experts, which will inevitably be passed on to the companies that are utilizing the computer telephony systems. Additionally, these companies will be further frustrated by the difficulty in getting computer telephony to work correctly, as they are used to traditional telephones that were plugged in and simply worked.

Another solution to audio configuration complexities that does not have as high a cost is the use of documentation. Companies have attempted to document, such as on a web page, an application note or in a user manual, the audio configuration issues for computer telephony clients and suggested solutions. Unfortunately, many, if not most, users do not have the initiative or the time to utilize such documentation. Therefore, this low cost solution has achieved results that are far from satisfactory.

It would be beneficial to have innovative techniques for validating an audio configuration of a computer. Additionally, it would be beneficial to have techniques that automatically checked the audio configuration of a computer telephony system and indicated to the user the settings that should be changed to fix or improve audio quality.

SUMMARY OF THE INVENTION

The present invention provides innovative techniques for validating an audio configuration of a computer. In general, one or a series of audio configuration settings of the computer are retrieved and compared to a stored optimal setting or settings. A report can then be generated to a user that indicates the audio configuration settings that should be changed, which can be specifically optimized according to the specific hardware of the computer system. In this manner, users can quickly and efficiently verify the audio configuration of their computers. Some embodiments of the invention are described below.

In one embodiment, the invention provides a computer implemented method of validating an audio configuration of a computer. An audio configuration setting of the computer is retrieved. The retrieved audio configuration setting is compared to a stored optimal setting. If the audio configuration setting is not equal to the stored optimal setting, a report, indicating that the audio configuration setting of the computer is not optimal, is displayed to a user. The stored optimal setting can be a specific value or a range of values that can be stored locally on the computer or remotely on a network.

In another embodiment, the invention provides a computer implemented method of validating an audio configuration of a computer. The computer is examined to determine hardware of the computer. An audio configuration setting of the computer is retrieved. The audio configuration setting is compared to a stored optimal setting based on the hardware of the computer. If the audio configuration setting is not equal to the stored optimal setting, a report, indicating that the audio configuration setting of the computer is not optimal, is displayed to a user. Typically, the hardware of the computer is stored in a configuration database, such as a WINDOWS Registry. In preferred embodiments, the stored optimal setting is one that is optimal for computer telephony applications.

In another embodiment, the invention provides a computer implemented method of validating an audio configuration of a computer. Multiple audio configuration settings of the computer are retrieved. The audio configuration settings are analyzed. If the audio configuration setting is not optimal in relation to one or more of the other audio configuration settings, a report, indicating that an audio configuration setting of the computer is not optimal, is displayed to a user. The audio configuration settings can be analyzed by computing a Boolean calculation, numerical calculation or the like.

Other features and advantages of the invention will become readily apparent upon the review of the following description in association with the accompanying drawings. In the drawings, the same or similar structures will be identified by the same reference numerals.

DETAILED DESCRIPTION OF EMBODIMENTS

In the description that follows, the present invention will be described in reference to embodiments that validate an audio configuration of a computer system. More specifically, the embodiments will be described in reference to preferred embodiments that validate the audio configuration of the computer for telephony applications. However, the invention is not limited to the specific applications, architectures or implementations described herein as the invention can be implemented in different ways. Therefore, the description of the embodiment that follows is for purposes of illustration and not limitation.

Figure 1:
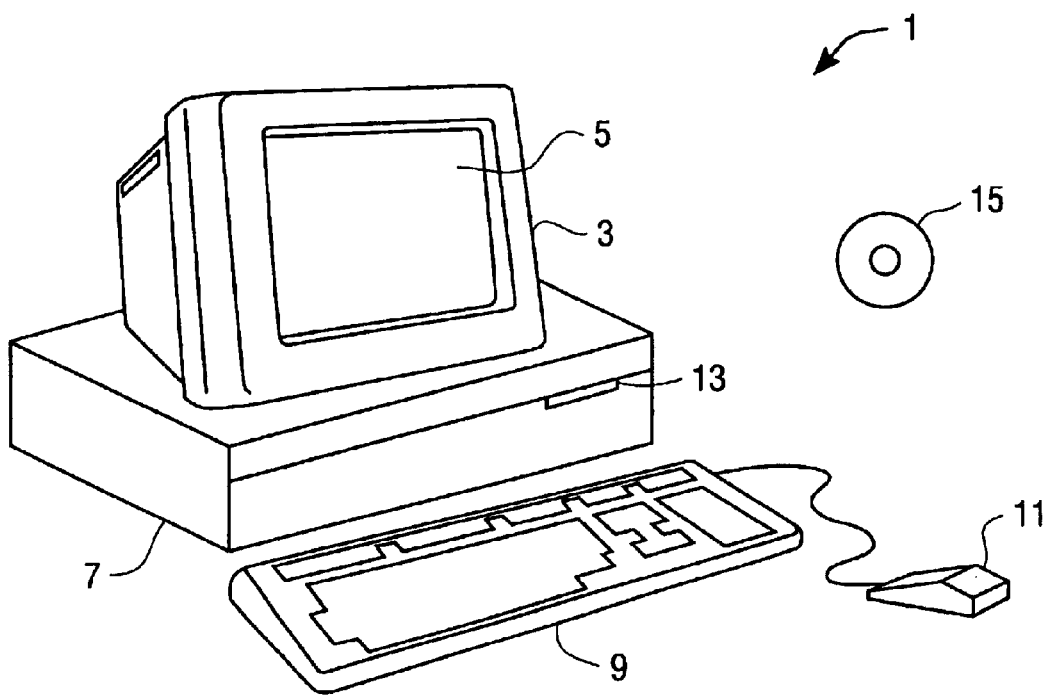
FIG. 1 illustrates an example of a computer system that can be utilized to execute the software of an embodiment of the invention and use hardware embodiments.

FIG. 1 illustrates an example of a computer system that can be used to execute the software of an embodiment of the invention and use hardware embodiments. FIG. 1 shows a computer system 1 that includes a display 3, screen 5, cabinet 7, keyboard 9, and mouse 11. Mouse 11 can have one or more buttons for interacting with a graphical user interface (GUI). Cabinet 7 houses a CD-ROM drive 13, system memory and a hard drive (see FIG. 2) which can be utilized to store and retrieve software programs incorporating computer code that implements aspects of the invention, data for use with the invention, and the like. Although CD-ROM 15 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 2:
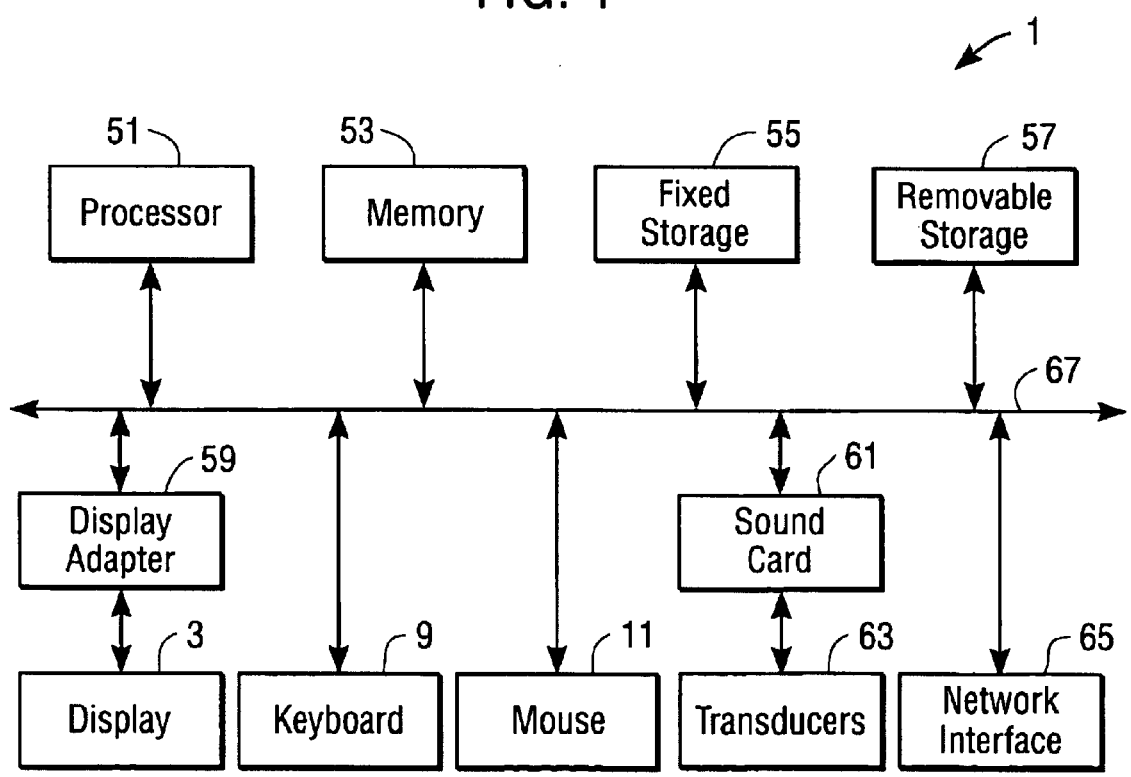
FIG. 2 illustrates a system block diagram of the computer system of FIG. 1.

FIG. 2 shows a system block diagram of computer system 1 used to execute a software of an embodiment of the invention or use hardware embodiments. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, transducers 63 (speakers, microphones, and the like), and network interface 65. The network interface may provide the communication to the computer telephony network. Other computer systems suitable for use with the invention can include additional or fewer subsystems. For example, another computer system could include more than one processor 51 (i.e., a multi-processor system) or a cache memory.

The system bus architecture of computer system 1 is represented by arrows 67. However, these arrows are illustrative of any interconnection scheme serving to link the subsystems. For example, a local bus could be utilized to connect the central processor to the system memory and/or display adapter. Computer system 1 shown in FIG. 2 is but an example of a computer system suitable for use with the invention. Other computer architectures having different configurations of subsystems can also be utilized.

Currently, computer telephony applications are executed on general purpose computers that have operating systems that are designed to run a wide variety of applications. Accordingly, there are typically numerous audio configuration settings that can be adjusted to accommodate specific applications, which can make validating an audio configuration difficult.

Figure 3:
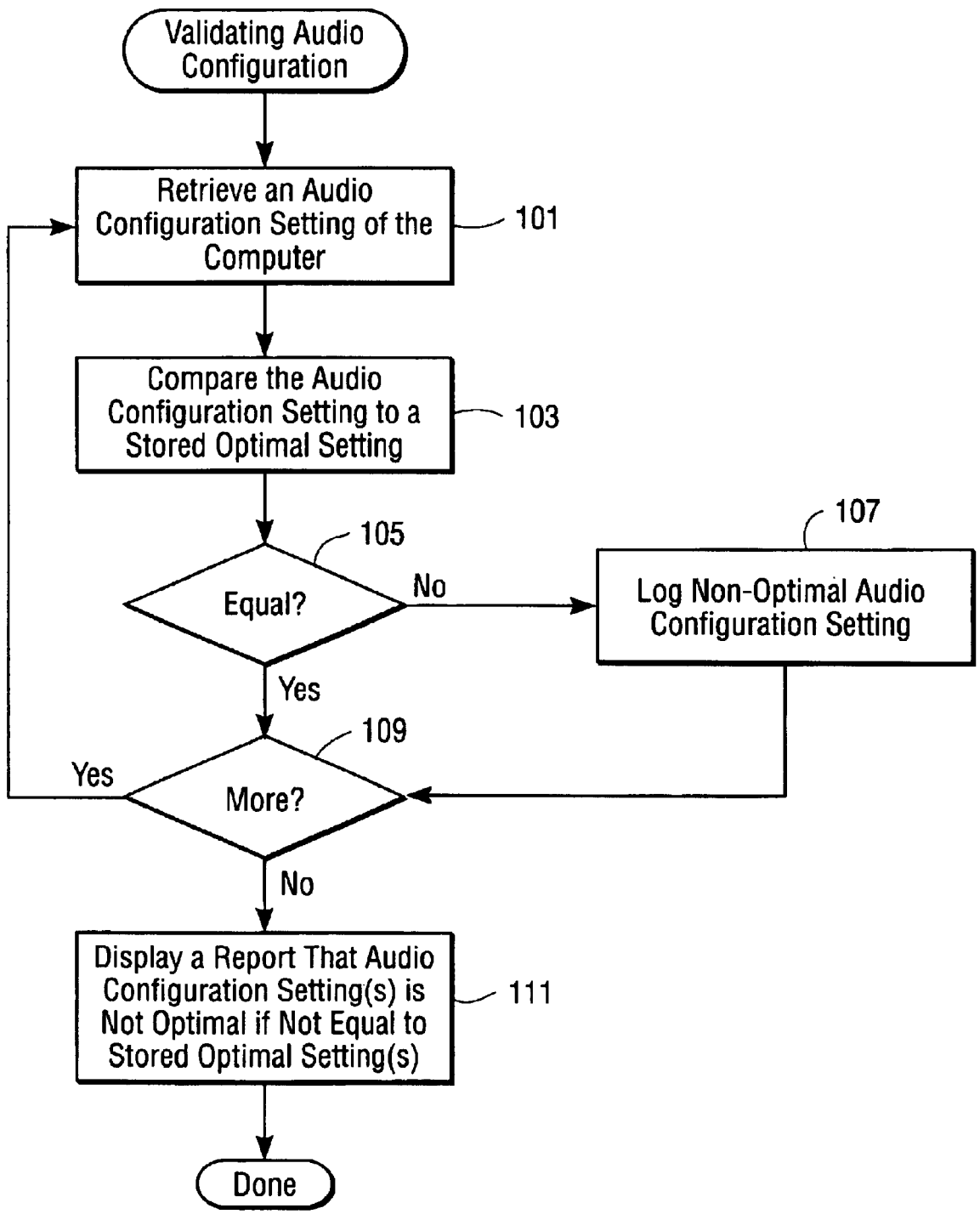
FIG. 3 shows a flowchart of a process of validating an audio configuration of a computer.

FIG. 3 shows a flow chart of a process of validating an audio configuration of a computer, according to a specific embodiment of the invention. The process can be initiated any number of ways, such as by a direct request of a user (e.g., clicking on a window object), upon start up of a computer telephony application, upon completion of installing a computer telephony application, and by remote access by information technology support personnel. At a step 101, an audio configuration setting of the computer is retrieved. Audio configuration settings are typically stored in a configuration database, which is the Registry in WINDOWS operating systems. Other operating systems have analogous mechanisms for storing configuration information.

The audio configuration setting is compared to a stored optimal setting at a step 103. The optimal setting can be a specific value or can specify a range of values. At a step 105, it is determined if the audio configuration setting is equal to the stored optimal setting. In the case where the optimal setting is a range of values, it is determined if the audio configuration setting is within the specified range. If the settings are determined to not be equal, the non-optimal audio configuration setting is logged at a step 107. Otherwise, it is determined whether there are more audio configuration settings to test at a step 109 and the flow continues to step 101 if there are more audio configuration settings to be tested.

At a step 111, a report, indicating that one or more audio configuration settings is not optimal if any were not equal to the stored optimal setting or settings, is displayed to a user. Generation of the report typically involves combining the non-optimal audio configuration settings that were logged at step 107. The report can indicate to the user the particular audio configuration settings that are not optimal, the reasons the audio configuration setting should be changed, the value that the audio configuration settings should be changed to, and additional instructions on how the user can implement the changes. In cases where a configuration setting is wrong, and there is only one correct reassignment, this correction can be made automatically and the user is advised. The report has been described as indicating the non-optimal configuration settings, however, the report can also include the audio configuration settings that are equal to or within optimal settings.

The flow chart described in reference to FIG. 3 can be utilized to validate an audio configuration of a computer and, more specifically, to validate the configuration for computer telephony applications. Another complication is that some hardware manufacturers (e.g., video card manufacturers) design their hardware so that it is better suited for some specific applications.

Figure 4:
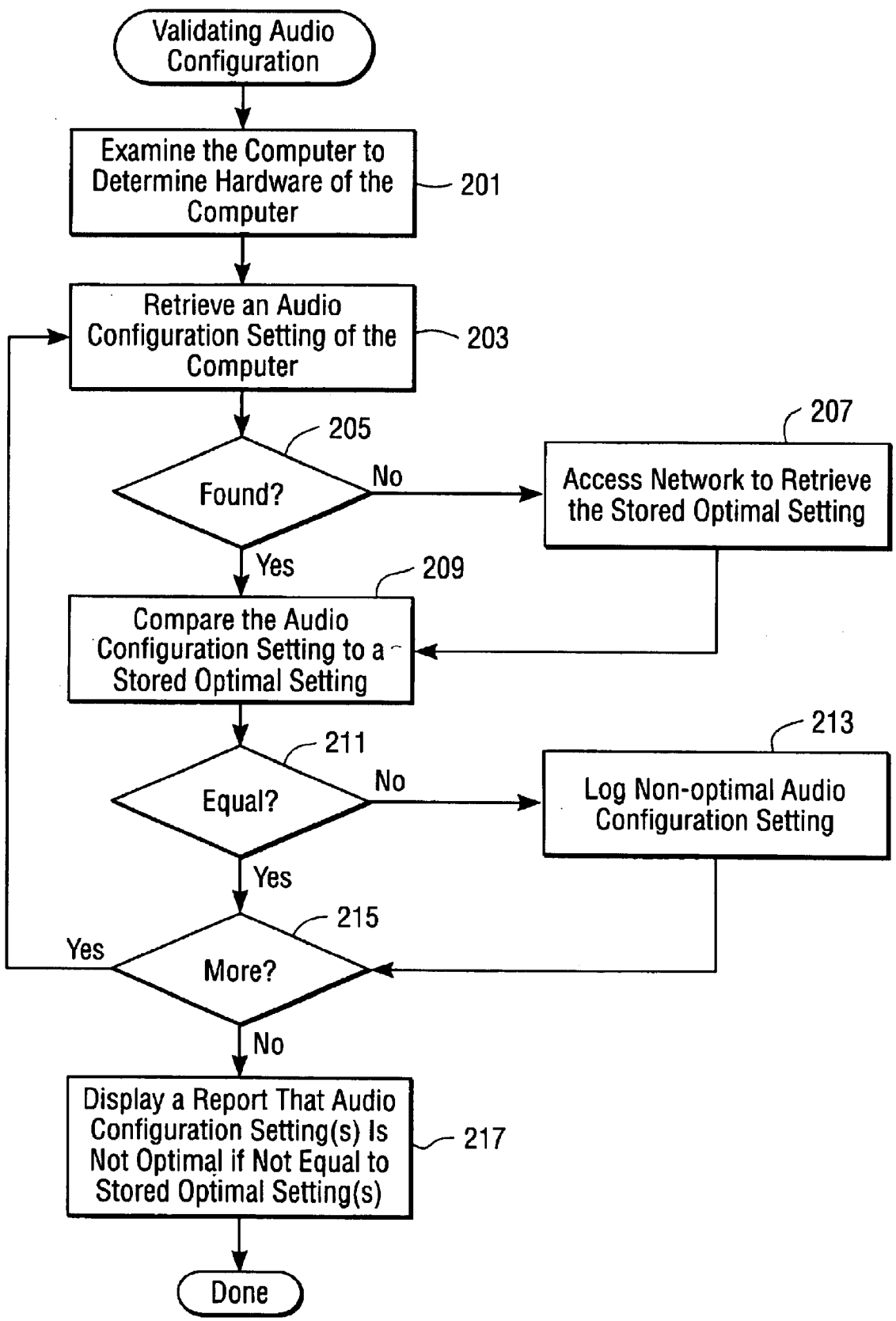
FIG. 4 shows a flowchart of a process of validating an audio configuration of a computer that takes into account the specific hardware of the computer.

Therefore, in some embodiments, the optimal settings can be adjusted or set according to the specific hardware that is in the computer. FIG. 4 shows a flowchart of a process of validating an audio configuration of a computer that takes into account the hardware of the computer. As seen in FIG. 4, at a step 201, the computer is examined to determine hardware of the computer. At a step 203, an audio configuration setting of the computer is retrieved. Typically, the identification of hardware installed on the computer, such as audio and video cards, is specified in a configuration database. In the newest version of the WINDOWS operating systems, the configuration database is the Registry. Software can examine the contents of the configuration database to determine the hardware of the computer. Other operating systems have similar mechanisms (including configuration files) that store this information.

It is then determined at a step 205 whether an optimal setting for the hardware of the computer is stored locally. If so, the system proceeds to step 209. However, if the stored optimal setting is not found locally, a network, such as a local area network or the Internet is accessed to retrieve the stored optimal setting at a step 207. For example, hardware manufacturers can store optimal settings for their hardware on their web site. It should be noted that not all of the configuration settings may be dependent upon the hardware of the computer and these configuration settings can be handled as described in reference to FIG. 3.

At a step 209, the audio configuration setting is compared to the stored optimal setting. As described above, the optimal setting can be a specific value or a range of values. If the audio configuration setting is determined at a step 211 not to be equal to the stored optimal setting, then the non-optimal audio configuration setting is logged at a step 213. If it is determined at a step 215 that there are more audio configuration settings to test, the system continues to step 203 to test the additional audio configuration settings.

Figure 8:
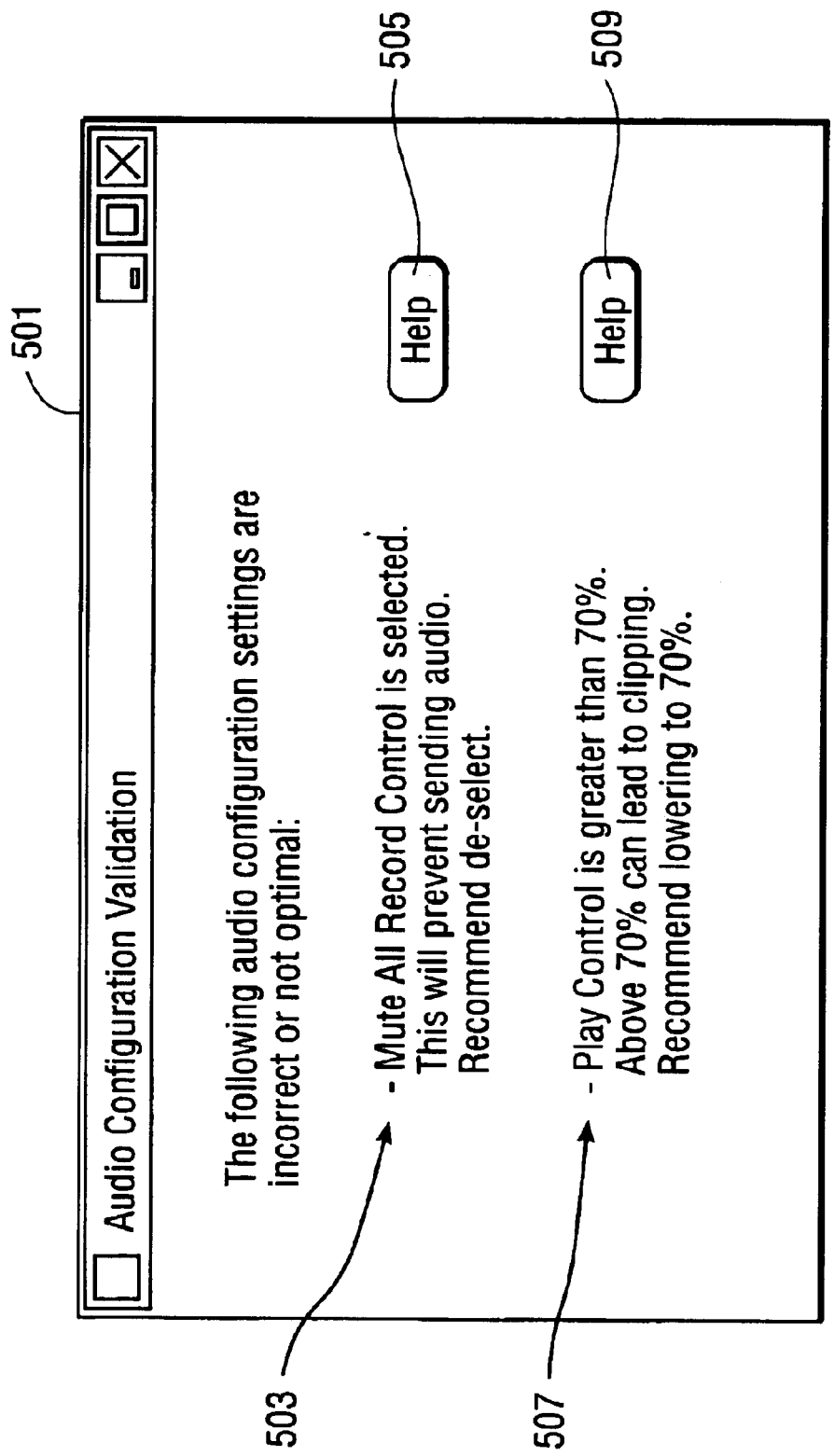
FIG. 8 shows a sample screen display of a report that indicates to a user audio configuration settings that are incorrect or not optimal for computer telephony applications.

If there are no more audio configuration settings to test, then at a step 217 a report, indicating that an audio configuration setting (or settings) is not optimal if the audio configuration setting is not equal to the stored optimal setting, is displayed. An example of a report that can be displayed is shown in FIG. 8 and will be described later in more detail in reference to that figure.

Figure 5:
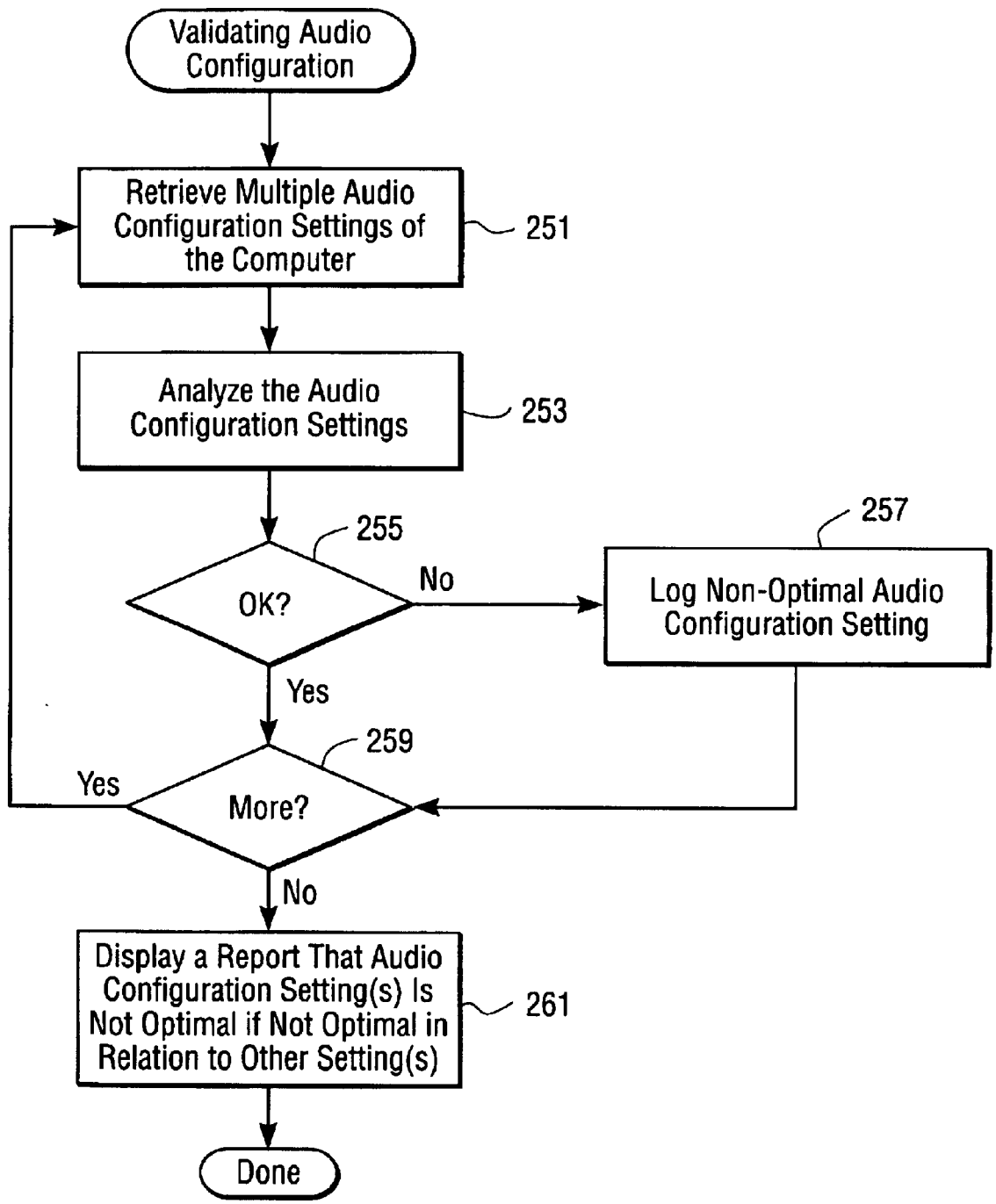
FIG. 5 shows a flowchart of a process of validating an audio configuration of a computer that analyzes multiple audio configuration settings in relation to one another.

FIG. 5 shows a flowchart of a process of validating an audio configuration of a computer that analyzes multiple audio configuration settings in relation to one another. At a step 251, multiple audio configuration settings of the computer are retrieved. The audio configuration settings then are analyzed at a step 253. The analysis can include Boolean, numerical or other calculations in order to determine if an audio configuration setting (or settings) is optimal or appropriate in relation to the other audio configuration setting or settings.

If, at a step 255, it is determined that an audio configuration setting is not optimal in relation to the other audio configuration settings, then the non-optimal audio configuration setting is logged at a step 257. Otherwise, it is determined whether there are more audio configuration settings to test at a step 259. The system continues to step 251 if there are more audio configuration settings to be tested.

If there are no more audio configuration settings to be tested, then at a step 261 a report, indicating that one or more audio configuration settings is not optimal if any were not optimal in relation to another audio configuration setting or settings, is displayed to a user. As before, the report can indicate to the user the particular audio configuration settings that are not optimal, the reasons the audio configuration setting should be changed, the value that the audio configuration settings should be changed to, and additional instructions on how the user can implement the changes.

FIGS. 3, 4 and 5 have described different types of analysis that can be utilized to test audio configuration settings. Although the flow charts have been described as different embodiments for ease of illustration, embodiments of the invention can include the tests of one or more of the flow charts.

Figure 6:
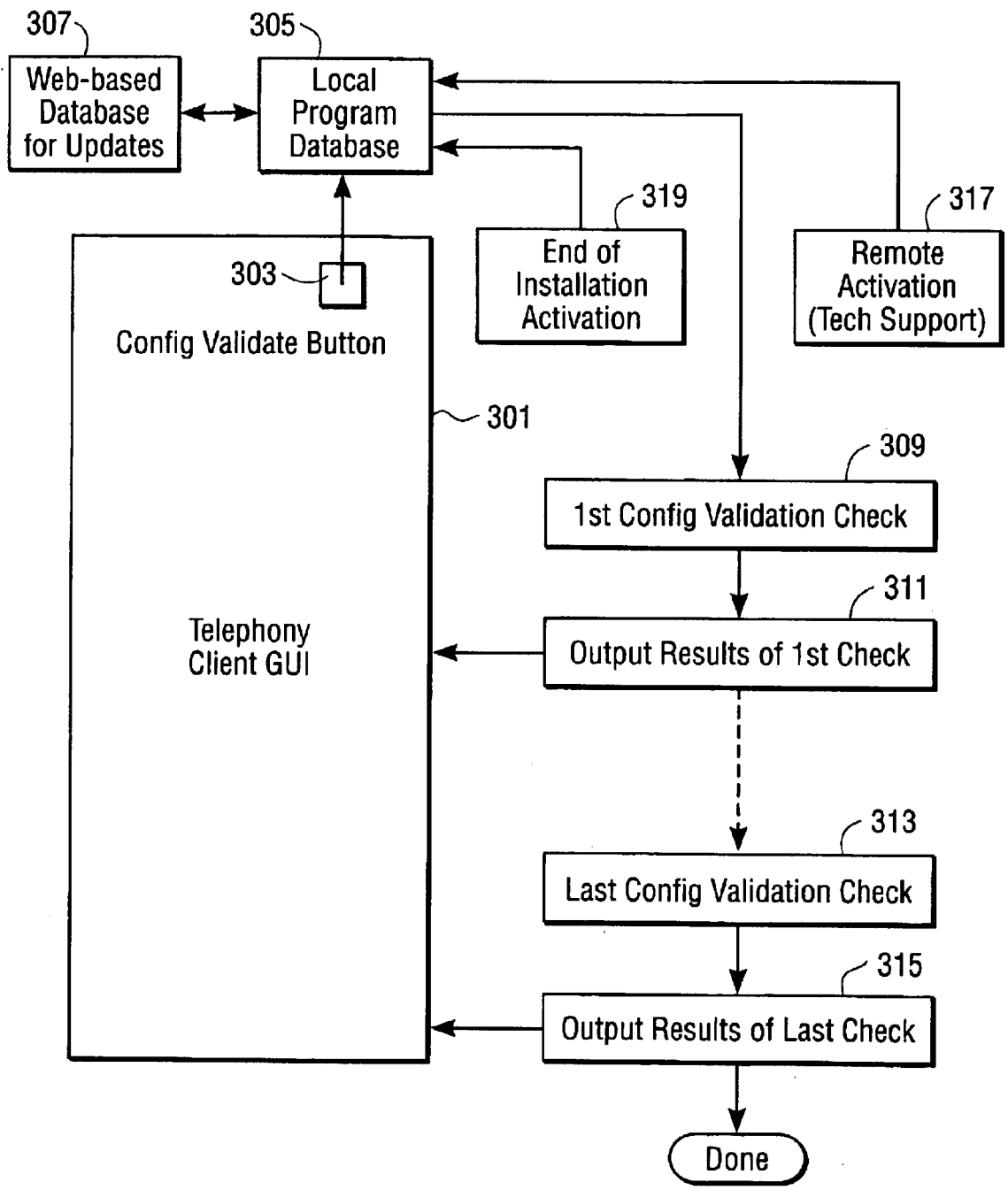
FIG. 6 shows a block diagram of an embodiment that allows users to have a series of validation checks performed on the audio configuration of a computer telephony system.

FIG. 6 shows a block diagram of one embodiment of the invention. A telephony client graphical user interface (GUI) 301 can be shown in screen 5 of computer system 1 (shown in FIG. 1). GUI 301 is shown to include a configuration validation button 303. When the user clicks on or otherwise activates button 303, software is executed to validate the audio configuration of the system and can include steps that are described herein.

In validating the audio configuration, a local program database 305 can be accessed in order to determine stored optimal settings for the audio configuration. Additionally, a network such as web-based database 307 can be accessed to identify other optimal settings. For example, web-based database 307 can store optimal settings for specific hardware. Once stored optimal settings are retrieved from a remote network, the optimal settings can be stored locally on the computer for subsequent use.

As shown, FIG. 6 illustrates that a series of audio configuration validation checks can be performed with the output results being displayed on GUI 301. A first configuration validation check 309 is performed and output results 311 of the first check are displayed to the user. Although a single validation check can be performed, typical embodiments include a series of validation checks that end with a last configuration validation check 313 and output results 315 of the last check that are displayed in GUI 301. The output results can be combined into a single report for the user to view.

As further shown in FIG. 6, remote activation 317 of audio validation checks can be initiated by technical support personnel, and activation 319 of audio validation checks at the end of installation also can be initiated.

In order to show one embodiment of the invention, the linear series of audio validation checks can be performed on a computer telephony system utilizing the WINDOWS (95, 98, and NT) operating system with a widely deployed sound card and driver installed, the SoundBlaster 16/AWE line. Analogous checks can be made on other computer telephony systems. For example, other less popular sound cards and drivers may require many of the same tests, but there can be some variations based on the capability of the card, the driver and the associated sound card software.

Figure 7A:
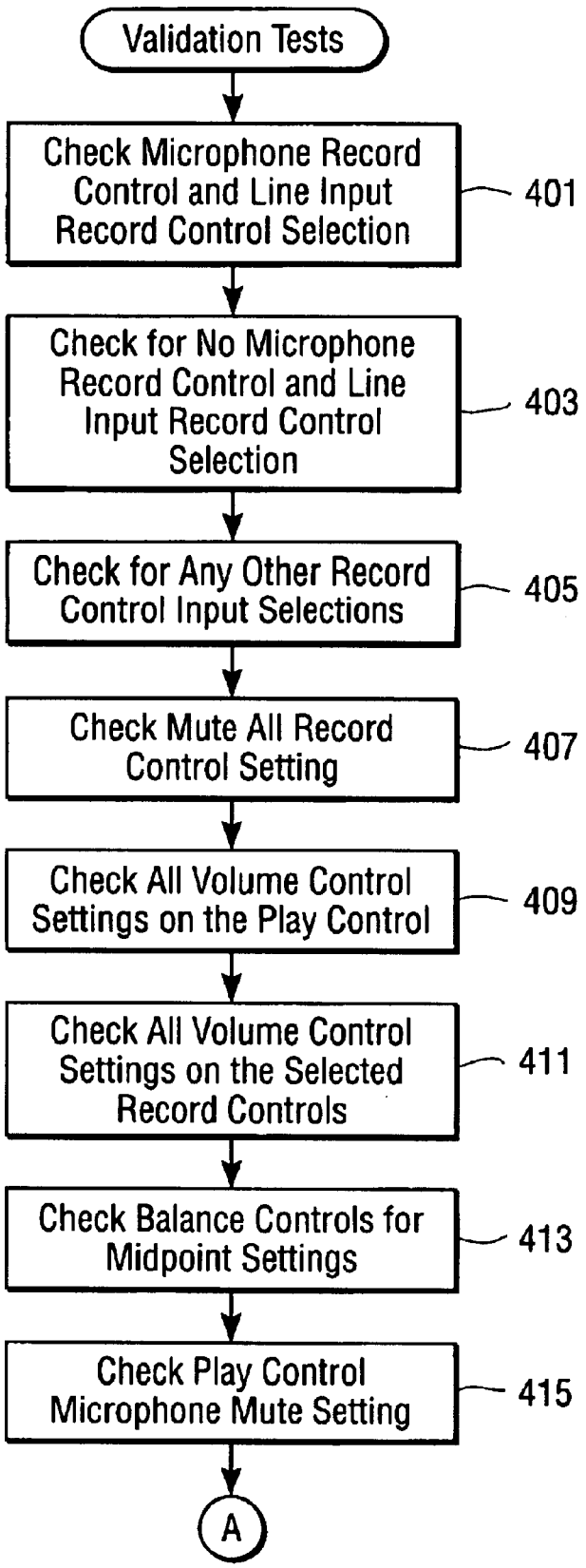
FIGS. 7A–7C show a flowchart of a series of validation tests that can be performed to validate the audio configuration of a computer telephony system.

At a test 401 of FIG. 7A, the Microphone Record Control and Line Input Record Control selection is checked. If the Microphone Record Control is not selected and the Line Input Record Control is selected, a message, sent to verify that a user's microphone is designed to be connected to the Line In port of the sound card as has been specified, can be displayed to the user. This message is generated because this is the correct audio configuration in only a small minority of cases. Additionally, a message can be issued that tells the user to verify that if this is the correct configuration, he should verify that the physical connection of the microphone is to the Line In port of the sound card. Further, a message can be displayed that indicates: if the user's microphone is designed to be connected to the Microphone Input, then the user needs to insure that the microphone is connected to the Microphone Input port on the sound card and to reconfigure the Microphone Record Control to be selected instead of the Line Input Record Control.

A check is made at a test 403 for no Microphone Record Control and Line Input Record Control selection. If neither the Microphone Record Control nor the Line Input Record Control is selected, a message can be displayed to the user that an error has been found with this part of the audio configuration. Computer telephony microphones almost always connect to one of these inputs, usually the Microphone Input port. If neither is selected, there is likely an error and the user can be informed that one of these selections should be made.

At a test 405, a check is made for any other Record Control input selections. If there are other Record Control inputs selected, the user can be informed that these other inputs should be deselected to eliminate one potential source of noise, unless, for example, the user wishes to play CD audio or a MIDI file as part of a computer telephony call.

The Mute All Record Control setting is checked at a test 407. If the Mute All Record Control is selected, a message can be displayed to the user that this is an error that will prevent sending any audio from this computer telephony system to the network.

At a test 409, all the volume control settings on the Play Control are checked. A message can be output for any volume control that is set above 70% of maximum advising the user that driving amplifiers in this top range can lead to clipping. Also, the user can be advised to reduce the volume control to 70% and then to increase the volume on the external speakers until the desired level is reached. The user can also be informed that if the volume on the external speakers are set to over 70% of maximum, a higher power amplifier may be needed so that a lower volume setting on the external speakers can be used in order to receive better audio quality.

All the volume control settings on the selected Record Controls are checked at a test 411. If any volume control setting is above 70% of maximum, the user can be advised that driving such preamplifiers in this top range can lead to clipping. If the user has to set the volume control setting to above 70% in order to get adequate volume at the far end, the user can be advised to investigate whether the microphone is plugged into the correct input port, whether the microphone's output voltage is sufficient, and whether the microphone's impedance is matched to the specifications of the sound card. If not, a message can be displayed advising the user that better sound quality can be obtained by either using a different microphone with specifications better matching the sound card or by inserting an intervening microphone amplifier.

At a test 413, the balance controls are checked for midpoint settings. If non-midpoint settings are found, a message will advise the user that non-midpoint settings of this control can cause one speaker to be driven at a higher volume than the other, causing the audio to sound different than most people are expecting. In one embodiment, non-midpoint settings are defined as being more than 5% from the nominal midpoint value. Thus, the midpoint range occupies the central 10% of the balance range.

The Play Control Microphone Mute setting is checked at a test 415. If the Play Control Microphone Mute setting is not selected, a message can be displayed advising the user that the output of the speakers will contain a mix of audio from the far end and his own amplified voice. This sidetone signal is far too loud with the SoundBlaster driver and cannot be appropriately adjusted with this driver. Thus, this mute setting should be selected (which turns off the sidetone) on this sound card and driver combination.

Figure 7B:
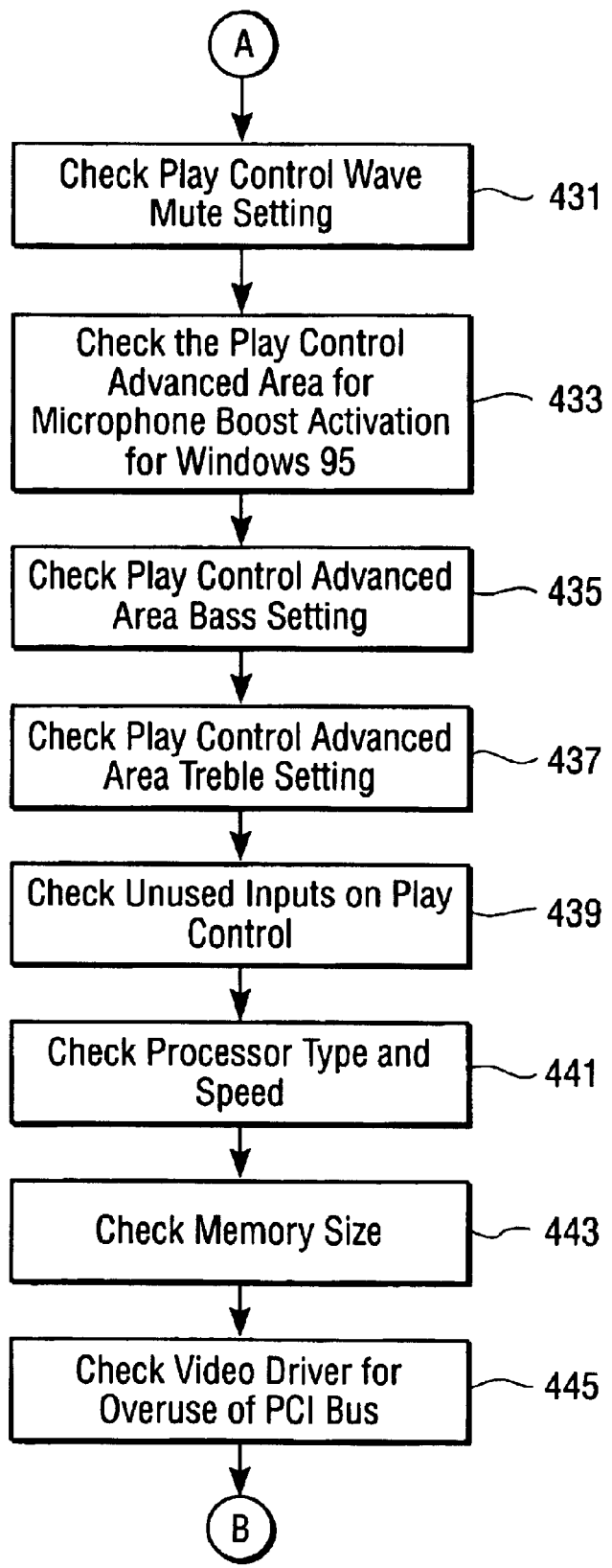

Referring now to FIG. 7B, the Play Control Wave Mute setting is checked in test 431. If the Play Control Wave Mute setting is selected, a message is displayed advising the user that this setting turns off the playing of computer telephony audio through his output device and is almost always an error in the audio configuration for this system.

At a test 433, the Play Control Advanced area for Microphone Boost activation is checked on WINDOWS 95 only. If the Microphone Boost activation is selected, the user is advised that background noise and/or echo are likely to be at unacceptably high levels. Microphone Boost activation permits the use of microphones that are not well matched to the sound card being used. However, Microphone Boost activation accomplishes this result through excessive, inherently high noise amplification. The user will be advised if this item is selected that it is much better to have a microphone that both matches the sound card being used and has this setting turned off. Another possibility is that the microphone is matched correctly but this setting was selected by mistake and the microphone record volume was reduced to compensate. In this case, the user is advised to simply deselect the Microphone Boost activation setting and increase the Record Control microphone volume setting, which will reduce background noise levels being transmitted. In summary, selecting this setting is almost always an error if one wishes to have high sound quality, and the user will be advised of the specifics of this setting.

The Play Control Advanced area Bass setting is checked at a test 435. If this setting is in the upper 33% of the range, a message is output that such a bass enhancement is associated with lower levels of vocal clarity and that reducing this setting can increase vocal clarity. Similarly, the Play Control Advanced area Treble setting can be checked at a test 437. If this setting is in the lower 33% of the range, a message can be output that such treble minimization is associated with lower levels of vocal clarity and that increasing this setting can increase vocal clarity.

The unused inputs on Play Control are checked at a test 439. A message can be displayed informing users that if they notice persistent background noise is being transmitted, they should try to mute the unused input in this control. For some sound cards, this will reduce background noise levels. Users that are not experiencing background noise problems can ignore this message.

At a test 441, the processor type and speed are checked. If the processor type and speed are below a recommended minimum, a message, reminding the user that audio quality and other problems may occur when running this computer telephony client on under powered systems, can be output. In a similar manner, the memory size is checked at a test 443. If the memory size is below a recommended minimum, the message reminding the user that audio quality and other problems may occur when running this computer telephony client on under powered systems.

At a test 445 the video driver is checked for overuse of the PCI bus. Some video drivers are known for their overly aggressive use of the PCI bus. A list of these video drivers is consulted and if a match is obtained, a message is displayed to advise that the use of the installed video driver can result in audio quality problems. If a video driver known to be more compatible with high audio quality exists for the card and the operating system being used, a message can be displayed specifying the exact name of that driver and where it can be obtained. In some embodiments, the better driver can be automatically located and downloaded (e.g., from the Internet).

Figure 7C:
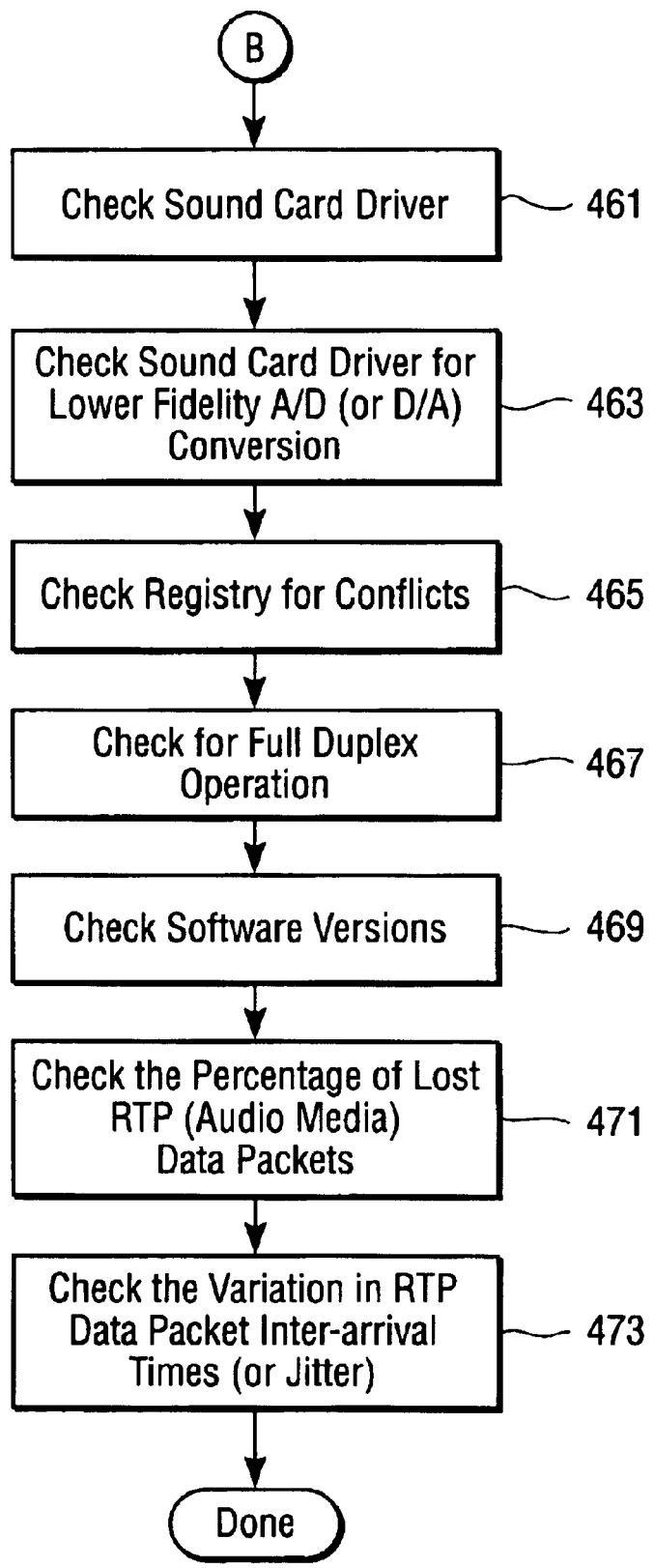

At a test 461 in FIG. 7C, the sound card driver is checked to determine if it creates known audio quality problems or if it adversely impacts system reliability. There are known sound card drivers that cause audio quality problems or adversely impact system reliability and the installed sound card driver is compared to a list of such drivers. If the sound card driver is on the list, a message is displayed informing the user that the current sound card driver may cause audio quality problems or adversely impact system reliability. The sound card driver can be checked to determine whether it is equal to or newer than the recommended earliest acceptable version. If the sound card driver is older than recommended, the user can be informed that sound quality can be increased or system reliability improved by installing a supported newer version.

The sound card driver can also be checked to determine if it uses lower fidelity analog-to-digital (or digital-to-analog) conversion for one of the two paths open for a full duplex connection at a test 463. There can be stored a list of sound card drivers that use lower fidelity conversion, and the current sound card driver can be checked if it is on that list. Some very popular sound cards support 16-bit A/D conversion for the first path opened but only 8-bit A/D conversion for the other path of a full duplex link. The user can be advised that if one direction of the communication from their computer telephony client is always low quality regardless of the end point, the lower fidelity conversion can be the cause. The user can be advised that the best solution is the replacement of the sound card with one that supports 16-bit or better A/D in both directions.

At a test 465, the Registry can be checked to see if the current audio configuration settings of the sound card are causing any conflicts. If the settings are causing a conflict, a message can be displayed informing the user exactly what resource (IRQ, port address or DMA) is conflicting and that the user should resolve his conflict in the Control Panel. Some misconfigurations in this area result in poor sound quality, and many misconfigurations can prevent the audio from working at all.

Full duplex operation is checked at a test 467. Full duplex operation is checked by opening the sound card for both input and output. If either the hardware or software driver do not permit this operation, a message notes the lack of full duplex support and advises the user that the installation of either an appropriate full duplex driver or a full duplex card and driver combination is required. The open connections to the sound card for both input and output should also be closed before the validation tests continue.

At a test 469, the software versions are checked for all installed software. A message is displayed indicating any software that is older than the oldest supported release or any software that is known to be incompatible with any other installed software.

At a test 471, the percentage of lost RTP (audio media) data packets is checked. The percentage of RTP data packets that were lost since the last of either system startup or the last audio configuration validation is determined. This percentage or value is read from the RTP software module and is not included in the WINDOWS Registry. If this value is more than a specific amount (e.g., 2%), a message indicating the percentage of RTP data packets being lost is displayed along with a notation that this can impact audio quality. Additionally, the user can be informed that a network and/or processor upgrade or configuration changes are likely needed to reduce this percentage. In one embodiment, the percentage is a variable that can be changed over time with an initial value of 2%.

The variation in RTP data packet inter-arrival times (also known as jitter) is checked at a test 473. The variation in RTP data packet inter-arrival times is determined since the last of either system startup or the last audio configuration validation. The variation is read from the RTP software module and is not included in the WINDOWS Registry. On a system without a jitter buffer, if the variation exceeds a predetermined amount, a message is output noting that jitter has reached the read variation and is impacting audio quality. In one embodiment the predetermined value is a variable that can be changed over time with an initial value of 50 milliseconds. On systems with a jitter buffer, if the read variation exceeds a predetermined value, a message notes that jitter has reached the read variation, which is impacting audio quality because delays of this magnitude constitute a problem in itself, apart from problems created by the variation. In one embodiment, the predetermined value is a variable set to initially 400 milliseconds.

Now that a series of validation tests in one embodiment have been described in detail, it may be beneficial to show an example of a report that can be displayed to a user. FIG. 8 shows a screen display including a window 501 that includes a report of the result from the validation tests as described in reference to FIGS. 7A–7C. A window 501 indicates that after performing the automated audio configuration validation, some audio configuration settings were determined to be incorrect or not optimal. A result 503 indicates that the Mute All Record Control is selected and that this will prevent sending audio. Additionally, result 503 includes a recommendation to the user to de-select the Mute All Record Control setting. In this embodiment, if the user is unsure how to make the recommended change to the audio configuration, a help button 505 can be activated and the user will be shown how to make the recommended audio configuration change. Result 503 can be generated from validation test 407 in FIG. 7A.

In FIG. 8, a result 507 indicates that the Play Control setting is greater than 70% and that a setting above 70% clipping may be evident. Additionally, result 507 recommends to the user to lower the Play Control to 70%. As before, a help button 509 may be activated by the user in order to receive more detained inspections on changing the audio configuration as recommended. Result 507 may be generated from validation test 409 in FIG. 7A.

In the report shown in FIG. 8, only the validation tests that recommended an audio configuration change were shown. In other embodiments, the report can include results from all the validation tests whether an audio configure change is recommended or not. It should be evident that the information and layout of the report can be varied greatly and the invention is not limited by the embodiment described herein.

While the above is complete description of an exemplary embodiment of the invention, various alternatives, modifications and equivalents can be used. It should be evident that the invention is equally applicable by making appropriate modifications to the embodiments described above. For example, the techniques described above were utilized to optimize an audio configuration for computer telephony but the invention can also be advantageously applied to optimizing or validating audio configurations or other uses. Therefore, the above description should not be taken as limiting the scope of the invention that is defined by the metes and bounds of the following claims along with their full scope of equivalents.

What is claimed:

1. A computer implemented method of validating an audio configuration of a computer, comprising:

retrieving an audio configuration setting of the computer;

comparing the audio configuration setting to a stored optimal setting; and displaying a report to a user that the audio configuration setting of the computer is not optimal if the audio configuration setting is not equal to the stored optimal setting.

2. The method of claim 1, wherein the stored optimal setting is a specific value or a range of values.

3. The method of claim 1, wherein the stored optimal setting is stored locally on the computer.

4. The method of claim 1, wherein the stored optimal setting is stored remotely on a network.

5. The method of claim 1, wherein the audio configuration relates to hardware of the computer.

6. The method of claim 5, further comprising retrieving the stored optimal setting for the hardware from a database that stores optimal settings for different hardware.

7. The method of claim 1, further comprising:

retrieving a plurality of audio configuration settings of the computer;

analyzing the plurality of audio configuration settings; and displaying in the report to the user that an audio configuration setting of the computer is not optimal if the audio configuration setting is not optimal in relation to one or more of the other audio configuration settings.

8. The method of claim 7, wherein analyzing further includes computing a Boolean or numerical calculation on the plurality of audio configuration settings.

9. The method of claim 7, wherein the report also includes the one or more of the other audio configuration settings.

10. The method of claim 1, wherein the report also includes the stored optimal setting.

11. The method of claim 1, wherein the report also includes information on changing the audio configuration.

12. The method of claim 1, wherein the audio configuration is one of a plurality of audio configurations that are validated.

13. The method of claim 1, wherein the stored optimal setting is optimal for computer telephony applications.

14. The method of claim 5, further comprising:

examining the computer to determine hardware of the computer; and wherein said stored optimal setting is also based on the hardware of the computer, and said hardware of the computer is stored in a configuration database.

15. The method of claim 14, wherein the configuration database is a WINDOWS Registry.

16. The method of claim 14, wherein the stored optimal setting is stored in a database that stores optimal settings for different hardware.

17. The method of claim 16, further comprising accessing a network to retrieve the stored optimal setting for the hardware if the stored optimal setting is not in the database that stores optimal settings for different hardware.

18. The method of claim 17, wherein the stored optimal setting is optimal for computer telephony applications.

19. A computer program product that validates an audio configuration of a computer, comprising:

computer code that retrieves an audio configuration setting of the computer;

computer code that compares the audio configuration setting to a stored optimal setting;

computer code that displays a report to a user that the audio configuration setting of the computer is not optimal if the audio configuration setting is not equal to the stored optimal setting; and a computer readable medium that stores the computer codes.

20. The computer program product of claim 19, wherein the computer readable medium is a CD-ROM, floppy disk, tape, flash memory, system memory, hard drive, or a data signal embodied in a carrier wave.

21. The computer program product of claim 19 further comprising:

computer code that examines the computer to determine hardware of the computer;

and wherein said stored optimal setting is further based on the hardware of the computer.

22. A system, comprising:

a processor; and a computer readable medium storing a computer program including computer code that retrieves an audio configuration setting of the computer, computer code that compares the audio configuration setting to a stored optimal setting, and computer code that displays a report to a user that the audio configuration setting of the computer is not optimal if the audio configuration setting is not equal to the stored optimal setting.

23. The system of claim 22, wherein the computer readable medium is a CD-ROM, floppy disk, tape, flash memory, system memory, hard drive, or a data signal embodied in a carrier wave.

24. The system of claim 22, wherein said computer program also includes computer code that examines the computer to determine hardware of the computer, and wherein said stored optimal setting is further based on the hardware of the computer.

25. A computer implemented method of validating an audio configuration of a computer, comprising:

retrieving a plurality of audio configuration settings of the computer;

analyzing the plurality of audio configuration settings; and displaying a report to a user that an audio configuration setting of the computer is not optimal if the audio configuration setting is not optimal in relation to one or more of the other audio configuration settings.

26. The method of claim 25, wherein analyzing further includes computing a Boolean or numerical calculation on the plurality of audio configuration settings.

27. The method of claim 25, wherein the report also includes the one or more of the other audio configuration settings.

28. The method of claim 25, wherein the report also includes information on changing the audio configuration.

29. The method of claim 25, wherein the audio configuration setting optimal in relation to the one or more of the other audio configuration settings for computer telephony applications.

30. A computer program product that validates an audio configuration of a computer, comprising:
- computer code that retrieves a plurality of audio configuration settings of the computer;
- computer code that analyzes the plurality of audio configuration settings;
- computer code that displays a report to a user that an audio configuration setting of the computer is not optimal if the audio configuration setting is not optimal in relation to one or more of the other audio configuration settings; and
- a computer readable medium that stores the computer codes.

31. The computer program product of claim 30, wherein the computer readable medium is a CD-ROM, floppy disk, tape, flash memory, system memory, hard drive, or a data signal embodied in a carrier wave.

32. A system, comprising:
- a processor; and
- a computer readable medium storing a computer program including computer code that retrieves a plurality of audio configuration settings of the computer, computer code that analyzes the plurality of audio configuration settings, and computer code that displays a report to a user that an audio configuration setting of the computer is not optimal if the audio configuration setting is not optimal in relation to one or more of the other audio configuration settings.

33. The system of claim 32, wherein the computer readable medium is a CD-ROM, floppy disk, tape, flash memory, system memory, hard drive, or a data signal embodied in a carrier wave.

* * * * *